United States Patent [19]

Humphrey

[11] 4,443,751
[45] Apr. 17, 1984

[54] PORTABLE BATTERY BOOSTER ASSEMBLY

[75] Inventor: Wayne R. Humphrey, Moline Acres, Mo.

[73] Assignee: Associated Equipment Corporation, St. Louis, Mo.

[21] Appl. No.: 382,817

[22] Filed: May 28, 1982

[51] Int. Cl.³ ............................................. H02J 7/00
[52] U.S. Cl. ..................................................... 320/2
[58] Field of Search ................................... 320/2, 3, 4

[56] References Cited

U.S. PATENT DOCUMENTS 2,626,972  1/1953  Marquardt .............................. 320/2
4,161,682  7/1979  Corvette ................................. 320/2

Primary Examiner—William M. Shoop
Assistant Examiner—Anita M. Ault
Attorney, Agent, or Firm—Cohn, Powell & Hind

[57] ABSTRACT

This portable battery booster assembly includes a booster battery having positive and negative electrical connections. A portable housing contains the booster battery. A negative booster clamp is electrically connected to the battery booster negative connection, and a positive battery booster clamp is electrically connected to the battery booster positive connection. A pair of electrically conductive terminals are carried by the portable housing with each terminal selectively receiving one of the booster clamps for providing an electrical connection between the terminal and the battery. The housing includes a handle with an insulated bar carried by the handle. The bar carries a pair of tubular sleeves which provide the conductive terminals. Insulators electrically isolate the two sleeves from each other and from the handle.

7 Claims, 3 Drawing Figures

PORTABLE BATTERY BOOSTER ASSEMBLY

BACKGROUND OF THE INVENTION

This invention relates to a portable battery booster assembly in general, and in particular to such an assembly having a storage battery, and a pair of terminals which selectively receive booster clamps connected to the battery, thereby providing an electrical connection between the terminals and the battery.

Prior portable battery booster assemblies include batteries for providing an electrical power source that is readily transportable to the location at which such power is required, such as for starting stalled vehicles. Such battery booster assemblies are utilized where it is not convenient to use an AC powered battery charger.

It is necessary to maintain the charge on the battery within the assembly, and to recharge the battery after it has been used. Some prior devices incorporate a charger built into the assembly. The use of a charger which is dedicated solely for use in recharging the battery within the assembly is often not required. In many applications, conventional AC powered battery chargers are available to the user of the portable assembly, therefore inclusion of an additional charger in the assembly results in a duplication of equipment.

Prior portable booster assemblies which do not include chargers are recharged by connecting their clamps to battery charger clamps. However, such connection can be awkward, not to mention dangerous, because sparks can result depending upon how the clamps are positioned when connected to the charger clamps.

SUMMARY OF THE INVENTION

This battery booster assembly includes a pair of electrically conducting terminals carried by a portable means for selectively receiving the booster clamps. When it is desired to charge the battery, a battery charger can be connected directly to the electrical terminals. Furthermore, when it is desired to operate equipment from the battery, such as trouble lights or other equipment, such equipment terminals can also be connected directly to the electrical terminals.

The portable battery booster assembly includes a booster battery having positive and negative electrical connections. A portable means carries the booster battery. A negative booster clamp is electrically connected to the booster battery negative connection, while a positive booster clamp is electrically connected to the booster battery positive connection. A pair of electrically conductive terminals are carried by the portable means. Each of the terminals selectively receives one of the booster clamps, providing an electrical connection between the terminal and the battery.

In one aspect of the invention, the portable means includes a handle means, and the terminals are carried by the handle means.

In another aspect of the invention, the handle means includes opposed side portions, and the terminals are carried between the opposed side portions of the handle means. In yet another aspect of the invention, each terminal comprises a conducting sleeve.

In still another aspect of the invention, each clamp includes opposed jaws in spring-biased closed relation, and each sleeve selectively receives a clamp with the clamp jaws about the sleeve.

In one aspect of the invention, a bar means carries both sleeves. The bar means is attached to the handle means opposed side portions. In another aspect of the invention, insulator means is carried on the bar means for electrically isolating the sleeves. The bar means is constructed of electrically non-conducting material. In still another aspect of the invention, the bar means has opposed ends connected to handle means, the sleeve means being carried by the bar in longitudinally spaced relation. A first insulator means is carried by the bar intermediate of the sleeves for electrically isolating the sleeves. Second insulated bushing means are carried by the bar at the opposed ends of the bar for electrically isolating the sleeves from the opposed side portions of the handle means.

DESCRIPTION OF THE PREFERRED EMBODIMENT

Figure 1:
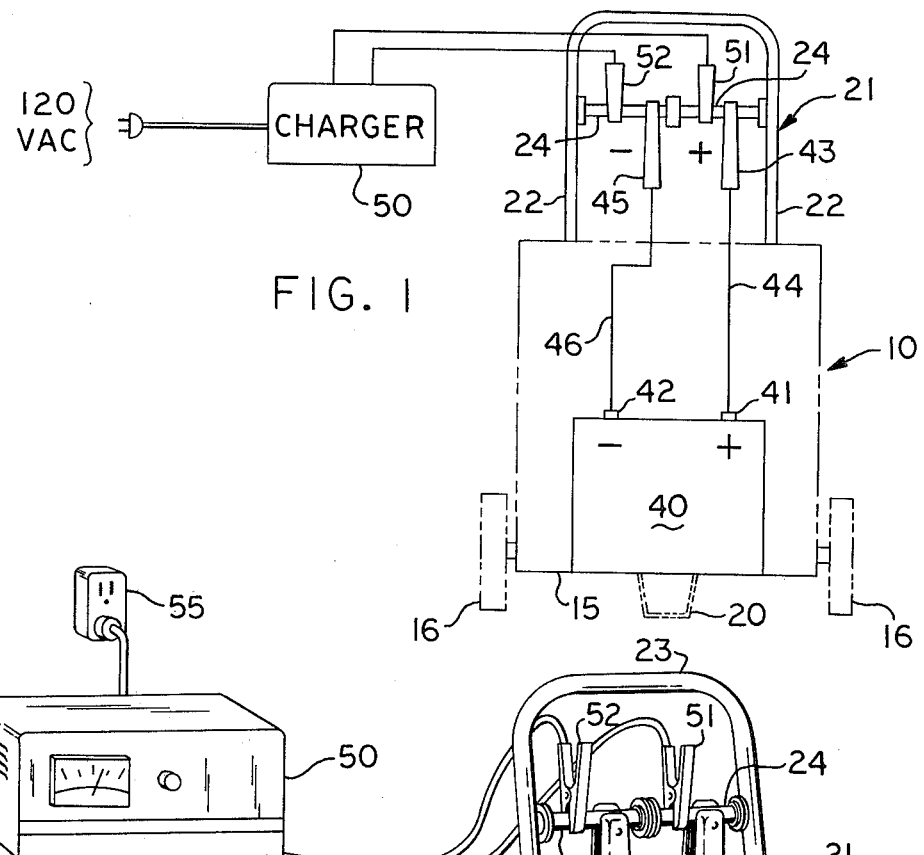
FIG. 1 is a schematic view of the battery booster cable assembly connected to a charger.
Figure 2:
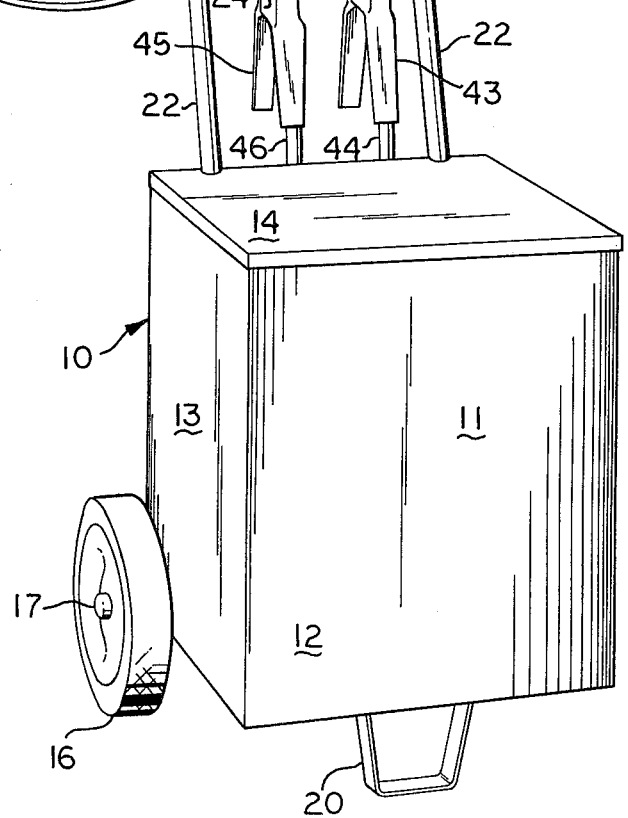
FIG. 2 is a perspective view of the battery booster assembly connected to a battery charger.

Referring now by characters of reference to the drawings, and first to FIG. 2, it will be understood that the battery booster assembly generally indicated by 10 includes a portable means comprising a housing 11 having a front wall 12, opposed sidewalls 13, a top wall 14, a bottom wall 15 (FIG. 1), and a rear wall (not shown). A pair of opposed side wheels 16 rotatively carried on an axis 17 are located at the lower rear portion of the housing 11, and are provided to facilitate moving of the booster assembly 10. A front U-shaped leg 20 is attached to the lower front portion of the housing 11 for providing a rest support for the housing 11.

Handle means, generally indicated by 21, include opposed side portions 22 connected to the housing 11, and an upper transverse portion 23 interconnecting the side portions 22. The handle means 21 can be formed by bending a piece of tubular material into the generally U-shaped configuration shown in the drawing.

Figure 3:
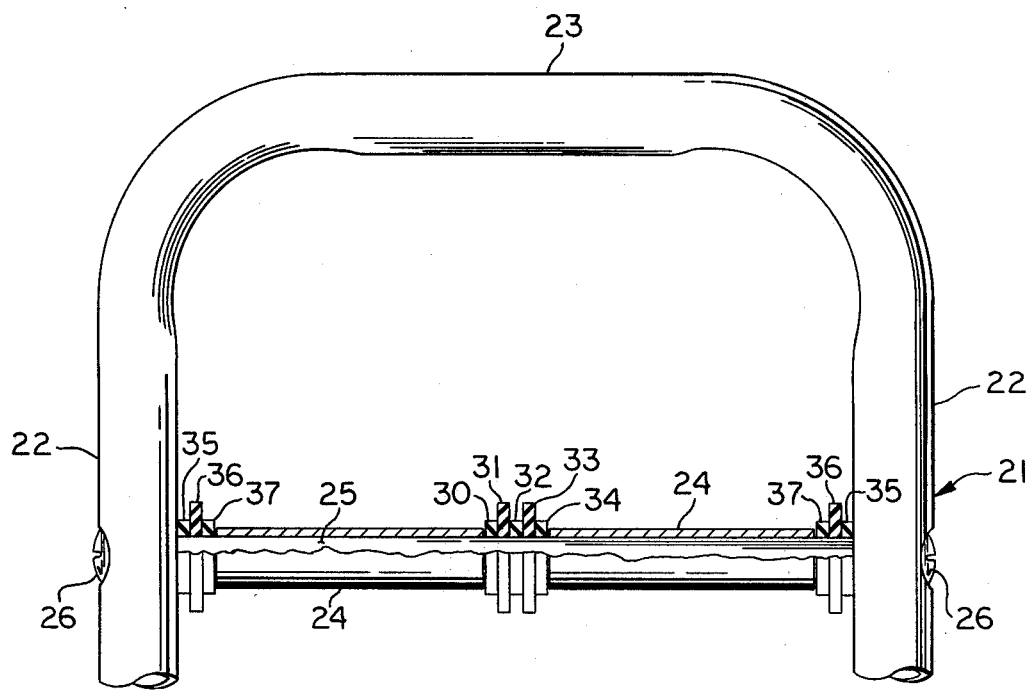
FIG. 3 is a fragmentary view partially in cross-section of the handle means and terminal assembly.

As is most clearly seen in FIG. 3, a pair of electrically conductive sleeves 24 providing electrically conductive terminals are carried on an insulated bar 25 extending between and attached to the opposed side portions 22 of the handle means 21. The bar 25 is attached to the handle portion 22 by opposed side screws 26. Insulated washers 30, 31, 32, 33 and 34 disposed about the bar 25 provide insulated means between the sleeves 24. Sets of insulated washers 35, 36 and 37 disposed about the bar 25 at opposed ends of the sleeves 24 provide insulated means between the sleeves 24 and the handle side portions 22.

As is seen in FIGS. 1 and 2, a battery 40 is carried within the housing 11. The battery 40 has a positive electrical connection 41 and a negative electrical connection 42, as is conventional. A positive booster clamp 43 is electrically connected as by a cable 44 to the positive electrical connection 41 of the battery 40. A negative booster clamp 45 is electrically connected as by a cable 46 to the negative electrical connection 42 of the battery 40.

The clamps 43 and 45 are conventional booster clamps having opposed side jaw portions in spring-biased closed relation. The sleeves 24 selectively receive the jaws of the clamps 43 and 45 for supporting and maintaining the clamps 43 and 45, and for providing an electrical connection between the sleeves 24 and the battery connections 41 and 42.

When it is desired to electrically charge the battery 40, a battery charger 50 of conventional type can be connected with its positive clamp 51 connected to the terminal 24 to which the positive booster clamp 43 is connected, and with its negative clamp 52 connected to the sleeve 24 to which the battery negative clamp 45 is connected. When the charger 50 is connected to a conventional source of power such as a 120 volts AC of the receptacle 55 of FIG. 2, power is proviced from the charger 50 through its clamps 51 and 52, through the sleeves 24, and through the booster clamps 43 and 45 and their associated cables 44 and 46 to the battery booster terminals 41 and 42.

It is thought that the structural features and functional advantages of the portable battery booster assembly have become fully apparent from the foregoing detailed description of parts, but for completeness of disclosure a brief description of the operation of the assembly will be given.

When it is desired to use the portable battery booster assembly 10, it is transported to the site at which it is needed as by carrying or wheeling. A typical application is that of boosting batteries of vehicles. In order to boost vehicle batteries, the booster clamps 43 and 45 are removed from the terminals 24 to which they are normally connected for storage purposes, and are connected to the electrical system of the vehicle to be boosted in a conventional manner. It is of course understood that when the battery booster assembly 10 is being transported, it is not connected to the charger 50, the charger clamps 51 and 52 having been removed from the terminals 24. Once the battery boosting operation is completed, the booster clamps 43 and 45 can be positioned on terminals 24 for storage purposes.

In addition to providing a portable boosting means, the assembly 10 can be utilized where a portable electrical supply is required. For example, such applications could be operating a portable trouble light, air compressor or other electrical equipment capable of being energized by the battery 40. For such use, such equipment is provided with conventional clamps for connection to battery terminals. Such clamps can be connected directly to the sleeve terminals 24. When so connected, an electrical connection is provided through the sleeves 24, and through the battery clamps 43 and 45 to the battery 40 for powering such equipment. When it is desired to recharge the battery 40 within the housing 11, the assembly 10 is transported to a site where a battery charger 50 can be electrically powered for charging the battery 40. The charger clamps 51 and 52 are connected to the sleeve terminals 24 for charging the battery 40.

I claim as my invention:
1. A portable battery booster assembly comprising:
 (a) a booster battery having positive and negative electrical connections,
 (b) a portable means carrying the booster battery,
 (c) a negative booster clamp electrically connected to the booster battery negative connection,
 (d) a positive booster clamp electrically connected to the booster battery positive connection,
 (e) a pair of electrically conductive terminals carried by the portable means, each terminal selectively receiving one of the booster clamps for providing an electrical connection between the terminal and the battery,
 (f) the portable means including a handle means,
 (g) the terminals being carried by the handle means,
 (h) the handle means including opposed side portions, and
 (i) the terminals being carried between the opposed side portions of the handle means.
2. A portable battery booster assembly as defined in claim 1, in which:
 (j) each terminal comprises a conducting sleeve.
3. A portable battery booster assembly as defined in claim 2, in which:
 (k) each clamp includes opposed jaws in spring-biased closed relation, and
 (l) each sleeve selectively receives a clamp with the clamp jaw about the sleeve.
4. A portable battery booster assembly as defined in claim 2, in which:
 (k) a longitudinal bar of insulating material has opposed ends connected to the opposed side portions of the handle means,
 (l) the sleeves are carried by the bar in longitudinally spaced relation,
 (m) a first insulator means is carried by the bar intermediate of the sleeves for electrically isolating the sleeves, and
 (n) second insulator means are carried by the bar at the opposed ends of the bar for electrically isolating the sleeves from the opposed side portions of the handle means.
5. A portable battery booster assembly as defined in claim 2, in which:
 (k) a bar means carries both sleeves, the bar means being attached to the handle means opposed side portions.
6. A portable battery booster assembly as defined in claim 5, in which:
 (l) insulator means is carried on the bar means for electrically insulating the sleeves.
7. A portable battery booster assembly as defined in claim 6, in which:
 (m) the bar means is constructed of non-conducting material.

* * * * *